US007225993B2

(12) United States Patent
Warther

(10) Patent No.: US 7,225,993 B2
(45) Date of Patent: *Jun. 5, 2007

(54) PRINTED SHEET PRODUCTS WITH INTEGRAL, REMOVABLE, RADIO FREQUENCY IDENTIFICATION ELEMENTS

(75) Inventor: Richard O. Warther, Malvern, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,437

(22) Filed: Feb. 7, 2006

(65) Prior Publication Data

US 2006/0124757 A1    Jun. 15, 2006

Related U.S. Application Data

(63) Continuation of application No. 10/279,752, filed on Oct. 23, 2002, now Pat. No. 6,994,262, which is a continuation-in-part of application No. 09/595,825, filed on Jun. 16, 2000, now abandoned, and a continuation-in-part of application No. 09/532,113, filed on Mar. 21, 2000, now Pat. No. 6,769,718, said application No. 60/401,789, said application No. 10/279,752.

(60) Provisional application No. 60/139,684, filed on Jun. 16, 1999.

(51) Int. Cl.
*G06K 19/06* (2006.01)

(52) U.S. Cl. ............... 235/492; 235/487; 283/61; 283/83

(58) Field of Classification Search ........ 235/492–493, 235/375, 380, 384–385, 449, 487, 462.01; 283/61–62, 80, 83

See application file for complete search history.

(56) References Cited

U.S. PATENT DOCUMENTS

| 4,978,146 A | 12/1990 | Warther et al. |
| 5,233,167 A | 8/1993 | Markman et al. |
| 5,340,968 A | 8/1994 | Wantanabe et al. |
| 5,366,249 A | 11/1994 | Diemert |
| 5,478,991 A | 12/1995 | Watanabe et al. |
| 5,495,981 A | 3/1996 | Warther |
| 5,581,257 A | 12/1996 | Greene et al. |
| 5,743,567 A | 4/1998 | Warther |
| 5,769,457 A | 6/1998 | Warther |
| 5,838,253 A | 11/1998 | Wurz et al. |
| 5,863,076 A | 1/1999 | Warther |
| 5,912,981 A | 6/1999 | Hansmire et al. |
| 6,010,159 A | 1/2000 | Warther |
| 6,039,356 A | 3/2000 | Warther et al. |

(Continued)

*Primary Examiner*—Thien M. Le
*Assistant Examiner*—Edwyn Labaze
(74) *Attorney, Agent, or Firm*—Akin Gump Strauss Hauer & Feld LLP

(57) ABSTRACT

Each printed sheet product includes a core of flexible, microvoided polymer sheet material and a planar RFID assembly encoded with a unique electro/magnetic code permanently and integrally joined together with the core. The microvoided sheet material collapses around the core so the sheet product remains planar. Scoring defines one or more individual identification elements removable from a remainder of the sheet product that include at least a first element with RFID assembly but only part of the core. A separate magnetic strip storing its own unique data magnetically can be provided on the first removable element even at least partially overlying the RFID assembly for independent identification operation.

12 Claims, 10 Drawing Sheets

U.S. PATENT DOCUMENTS

| | | |
|---|---|---|
| 6,050,622 A | 4/2000 | Gustafson |
| 6,089,611 A | 7/2000 | Blank |
| 6,290,138 B1 | 9/2001 | Ohno et al. |
| 6,305,716 B1 | 10/2001 | Warther et al. |
| 6,325,294 B2 | 12/2001 | Tuttle et al. |
| 6,588,658 B1 | 7/2003 | Blank |
| 6,693,544 B1 | 2/2004 | Hebbecker |
| 6,769,718 B1 | 8/2004 | Warther et al. |
| 6,994,262 B1 | 2/2006 | Warther |
| 2003/0173408 A1* | 9/2003 | Mosher et al. ............... 235/492 |
| 2006/0091671 A1* | 5/2006 | Raming ...................... 283/105 |

* cited by examiner

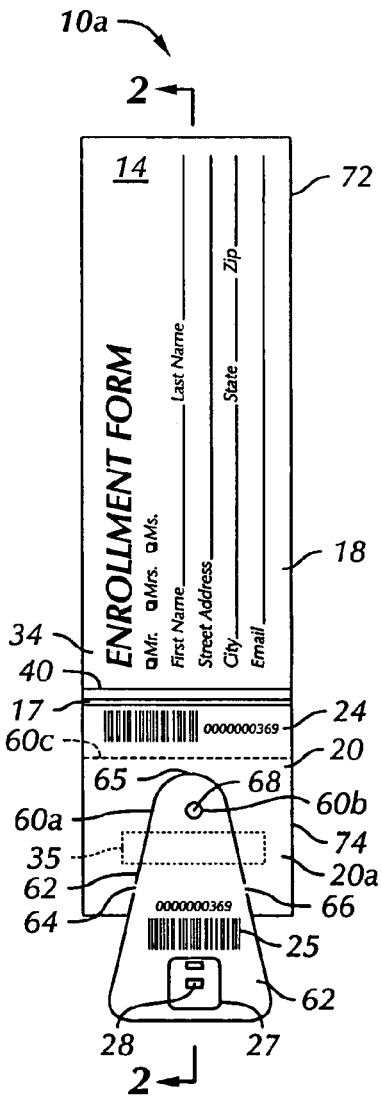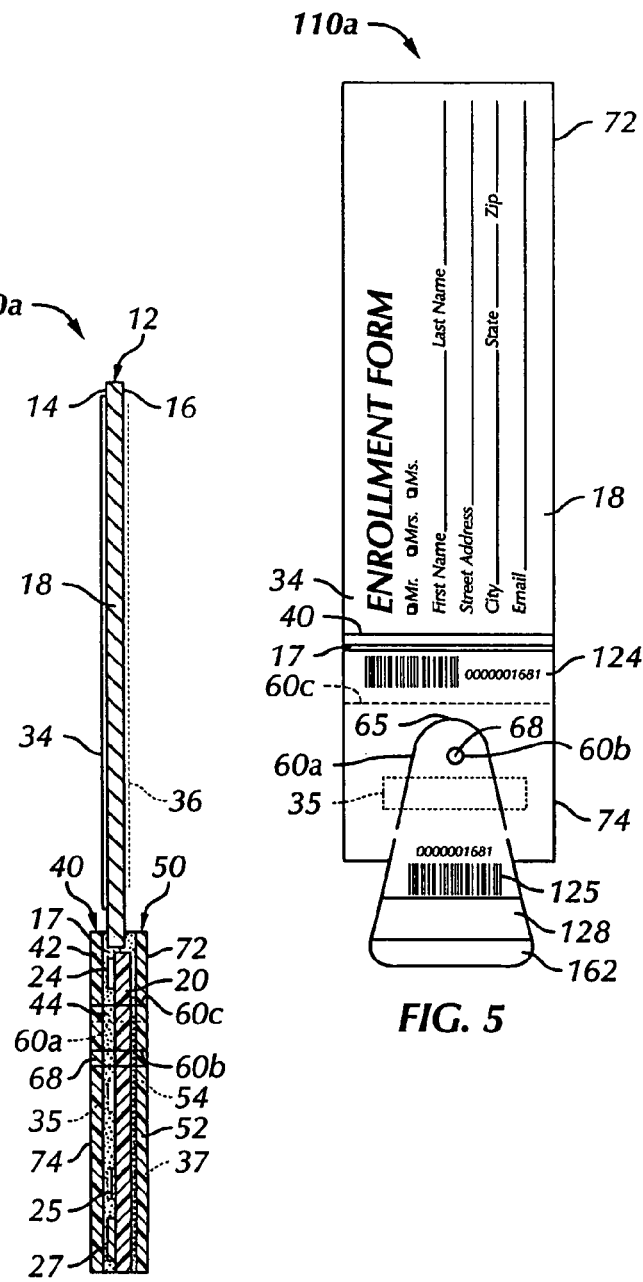

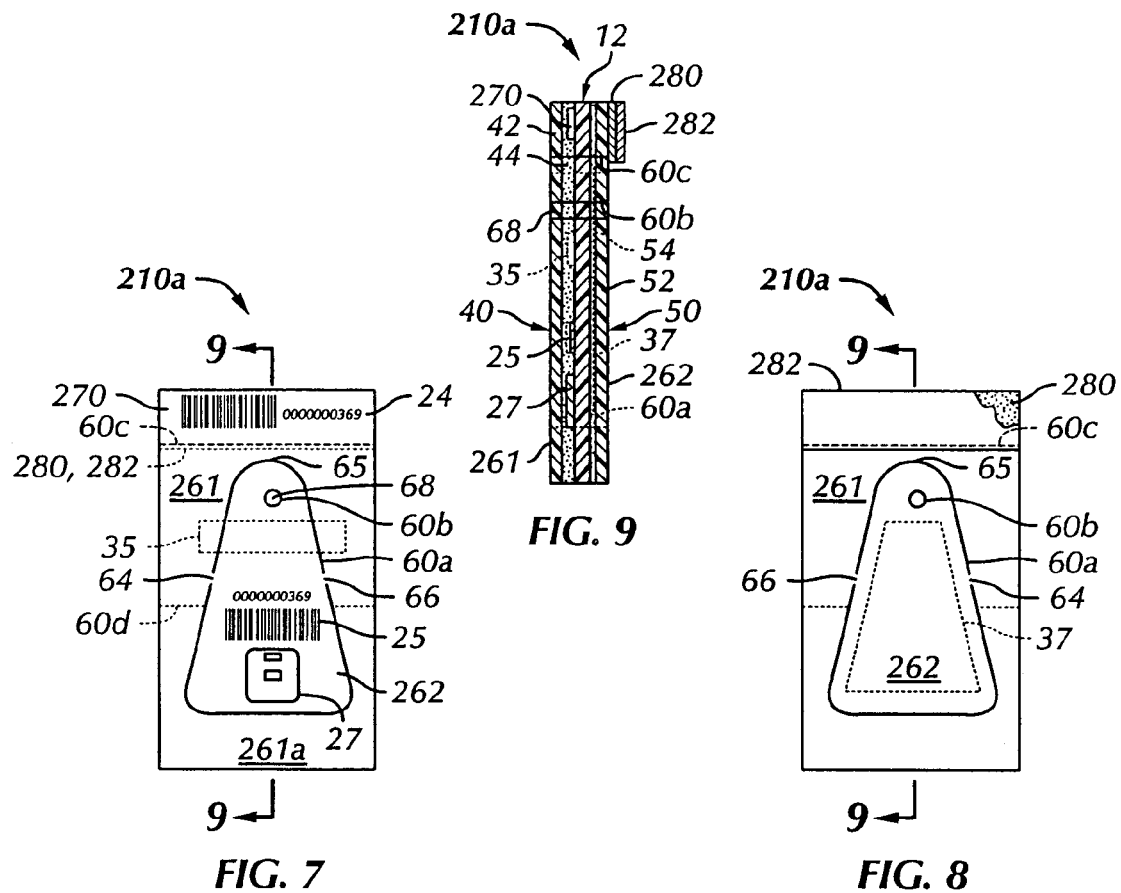
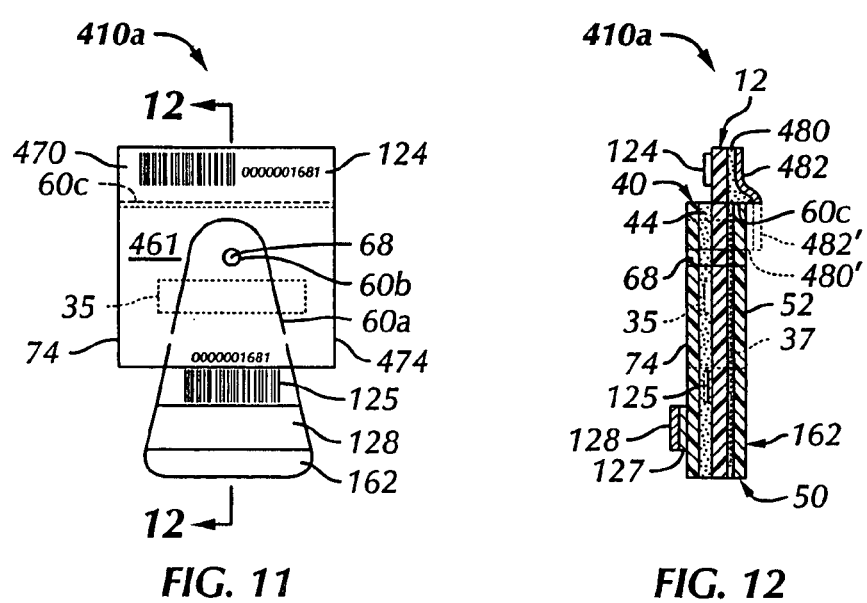

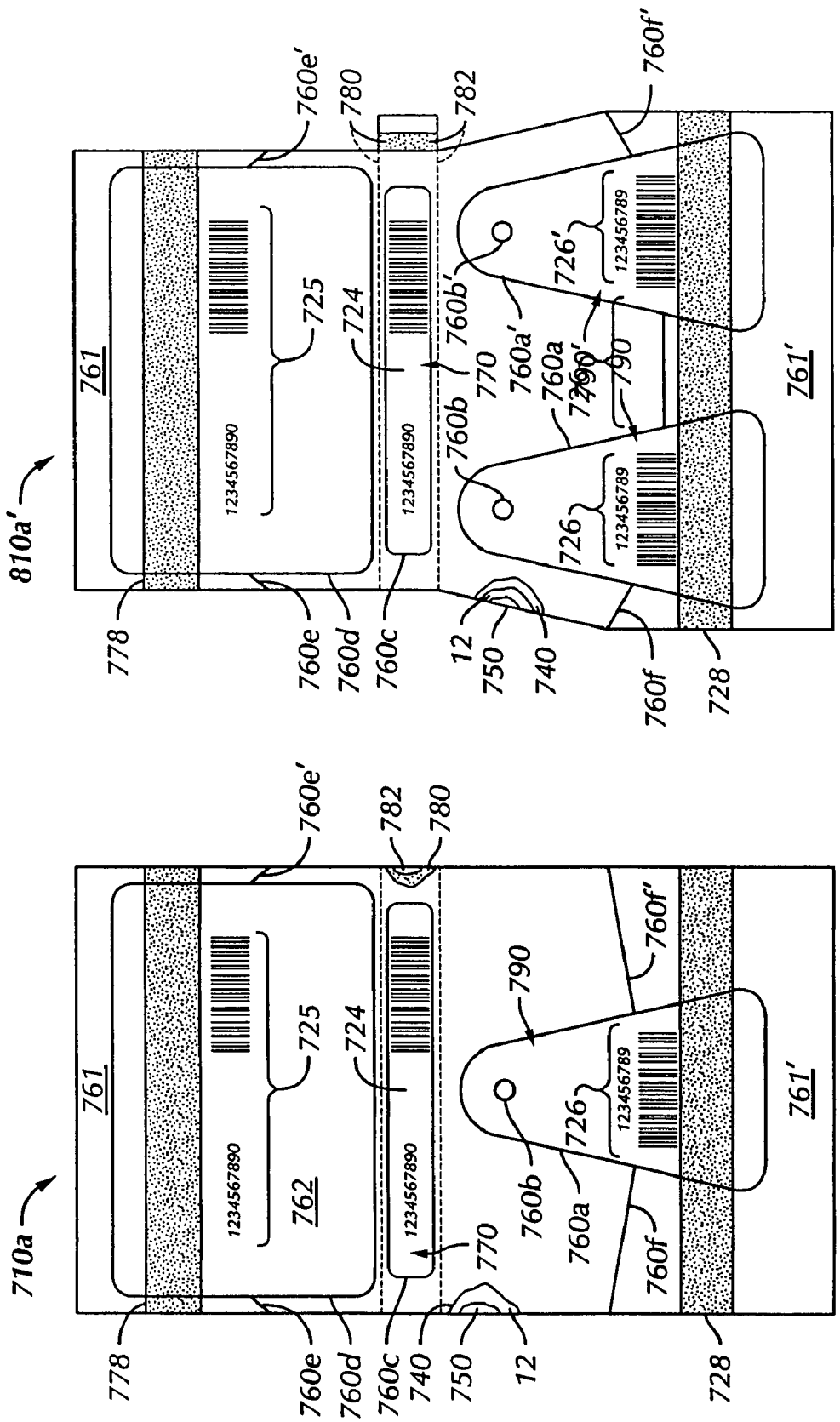

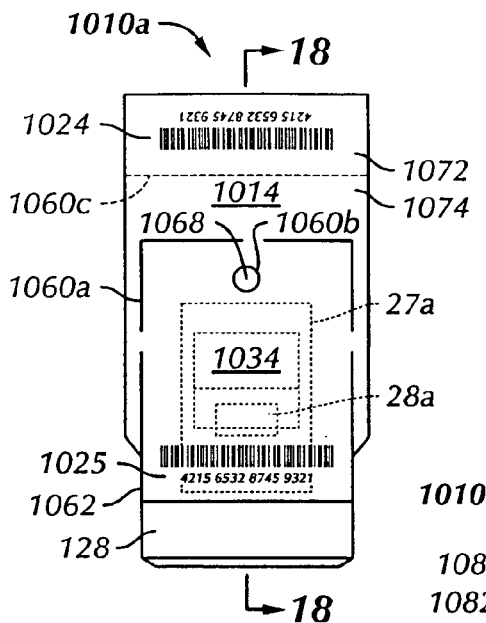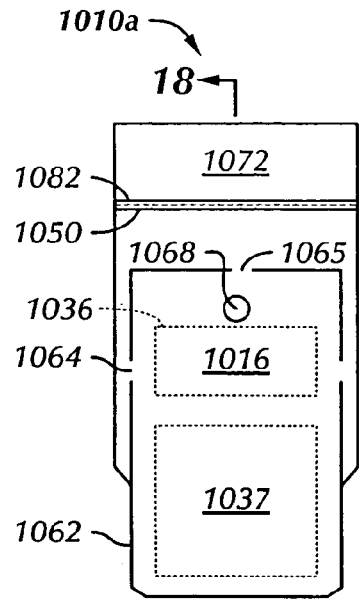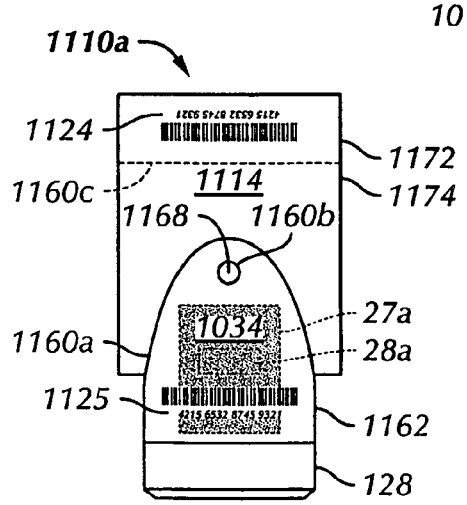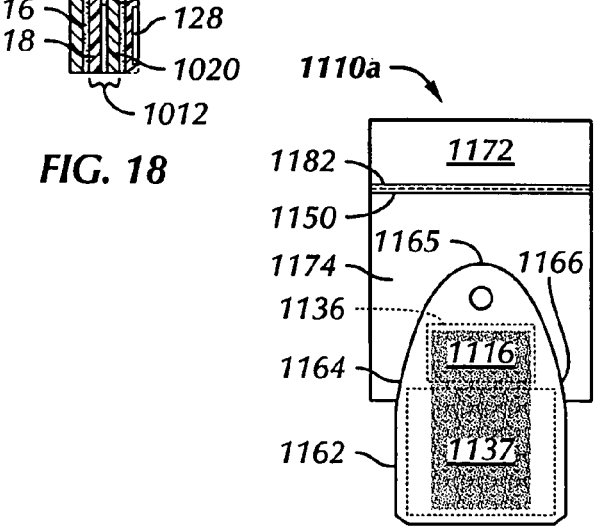
FIG. 17　　FIG. 19　　FIG. 18　　FIG. 22　　FIG. 23

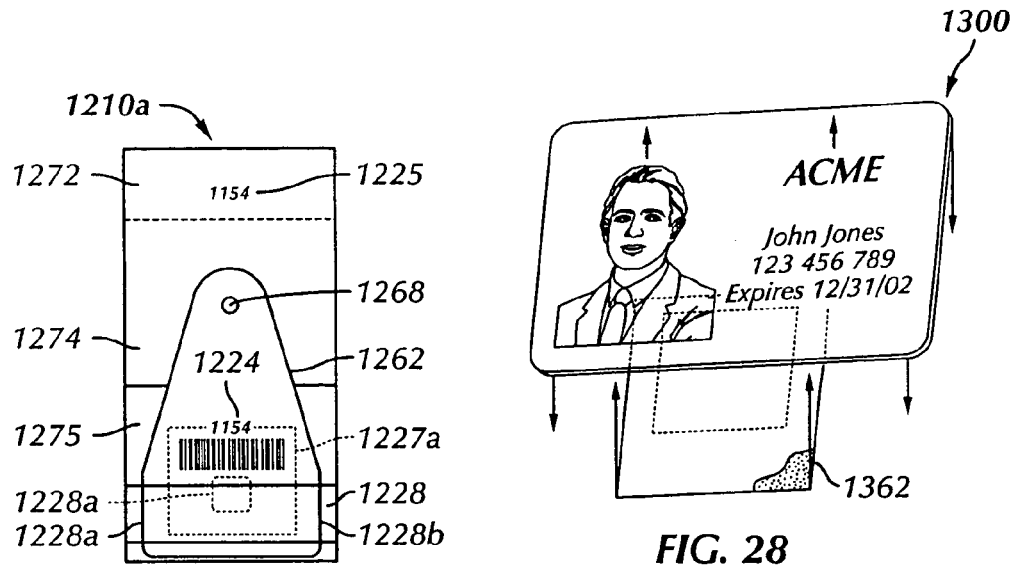
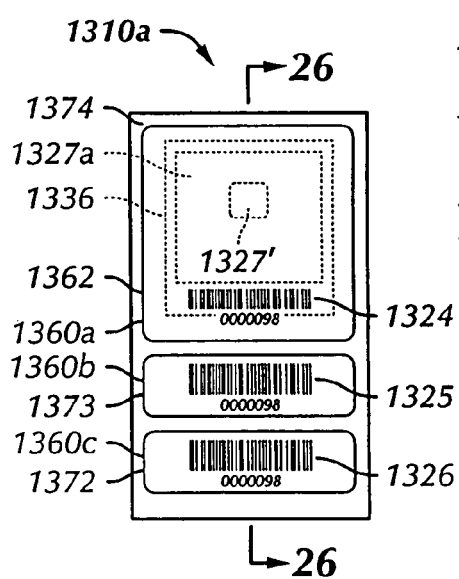
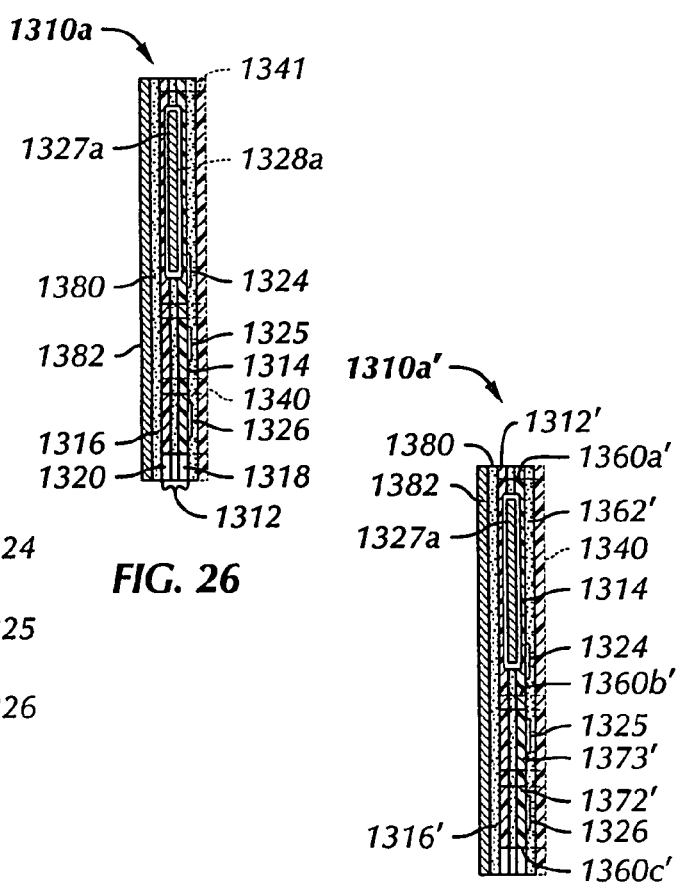

PRINTED SHEET PRODUCTS WITH INTEGRAL, REMOVABLE, RADIO FREQUENCY IDENTIFICATION ELEMENTS

CROSS-REFERENCE TO RELATED APPLICATIONS

This application is a continuation of application Ser. No. 10/279,752, filed Oct. 23, 2002 now U.S. Pat. No. 6,994,262, which is a continuation-in-part of application Ser. No. 09/595,825, filed Jun. 16, 2000 now abandoned, which is related to application Ser. No. 60/139,684, filed Jun. 16, 1999, and is a continuation-in-part of application Ser. No. 09/532,113, filed Mar. 21, 2000 now U.S. Pat. No. 6,769,718, and is related to application Ser. No. 60/401,789, filed Aug. 7, 2002.

BACKGROUND OF THE INVENTION

The present invention relates to sheet products and, in particular, to printed form sheet products with sets of uniquely encoded transaction cards, tags, labels and other removable identification elements.

Various printed sheet product including uniquely encoded identification elements removable from a larger printed sheet product with other elements and/or other unique information (e.g., name and address of individual assigned unique identifier element) are disclosed in U.S. Pat. Nos. 4,978,146; 5,863,016; 6,010,159 and 6,039,356. It would be desirable to provide similar or other identification elements with greater data capability and/or more diverse uses.

BRIEF SUMMARY OF THE INVENTION

In the broadest aspect, the invention is a multilayer, integral, individual printed sheet product comprising a flexible sheet core having major opposing first and second sides, the core being printed on at least one of the major sides, the printing on at least the one major side including at least a first variable data field with a unique printed code; a first flexible cover strip integrally and permanently secured to the first side of the core; a radio frequency responsive data storage element permanently and integrally fixed together with at least one of the core and the first cover strip; and scoring extending at least sufficiently through the sheet product to define a first identification element removable from a remainder of the sheet product, the first removable identification element including at least the radio frequency responsive data storage element and only part of the first flexible cover strip, and a remainder of the first flexible cover strip being left on a remainder of the core bearing at least the first printed variable date field with unique printed code.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings, which are at least partially diagrammatic:

FIG. 1 is a plan view of a first embodiment exemplary individual printed sheet product of the present invention with integral removable radio frequency responsive identification element.

FIG. 2 is a cross-sectional view of the individual printed sheet product of FIG. 1 taken along the lines 2-2 in FIG. 1;

FIG. 5 is a plan view of a second embodiment exemplary individual printed sheet product with integral, removable electro/magnetic identification element;

FIG. 7 is a plan view of a third embodiment exemplary individual printed sheet product with integral, removable, electro/magnetic identification element;

FIG. 8 is a plan view of the opposite side of the third embodiment of FIG. 7;

FIG. 9 is a cross section of the product of FIG. 7 taken along the lines 9-9 in FIGS. 7 and 8;

FIG. 11 is a plan view of a fifth embodiment exemplary individual printed sheet product of the present invention;

FIG. 12 is a cross-section taken along the line 12-12 of FIG. 11.

FIG. 15 is a plan view of an eighth embodiment exemplary individual printed sheet product of the present invention;

FIG. 16 is a plan view of a ninth embodiment exemplary individual printed sheet product of the present invention;

FIG. 17 is a top plan view of a tenth embodiment exemplary individual printed sheet product of the present invention;

FIG. 18 is a cross section view taken along line 18-18 of FIG. 17;

FIG. 19 is a bottom plan view of the embodiment of FIG. 17;

FIG. 22 is a top plan view of an eleventh embodiment exemplary individual printed sheet product of the present invention;

FIG. 23 is a bottom plan view of the element FIG. 22;

FIG. 24 is a top plan view of a twelfth embodiment exemplary individual printed sheet product of the present invention;

FIG. 25 is a top plan view of a thirteenth embodiment exemplary individual printed sheet product of the present invention;

FIG. 26 is a cross section taken along lines 26-26 in FIG. 25;

FIG. 27 is a cross section taken along lines 26-26 in FIG. 25 of an alternate construction of the thirteenth embodiment; and FIG. 28 is a perspective view of the RFID tag of the thirteenth embodiment exemplary individual sheet product of FIG. 25 mounted to a conventional identification card.

DETAILED DESCRIPTION OF THE INVENTION

Figure 3:
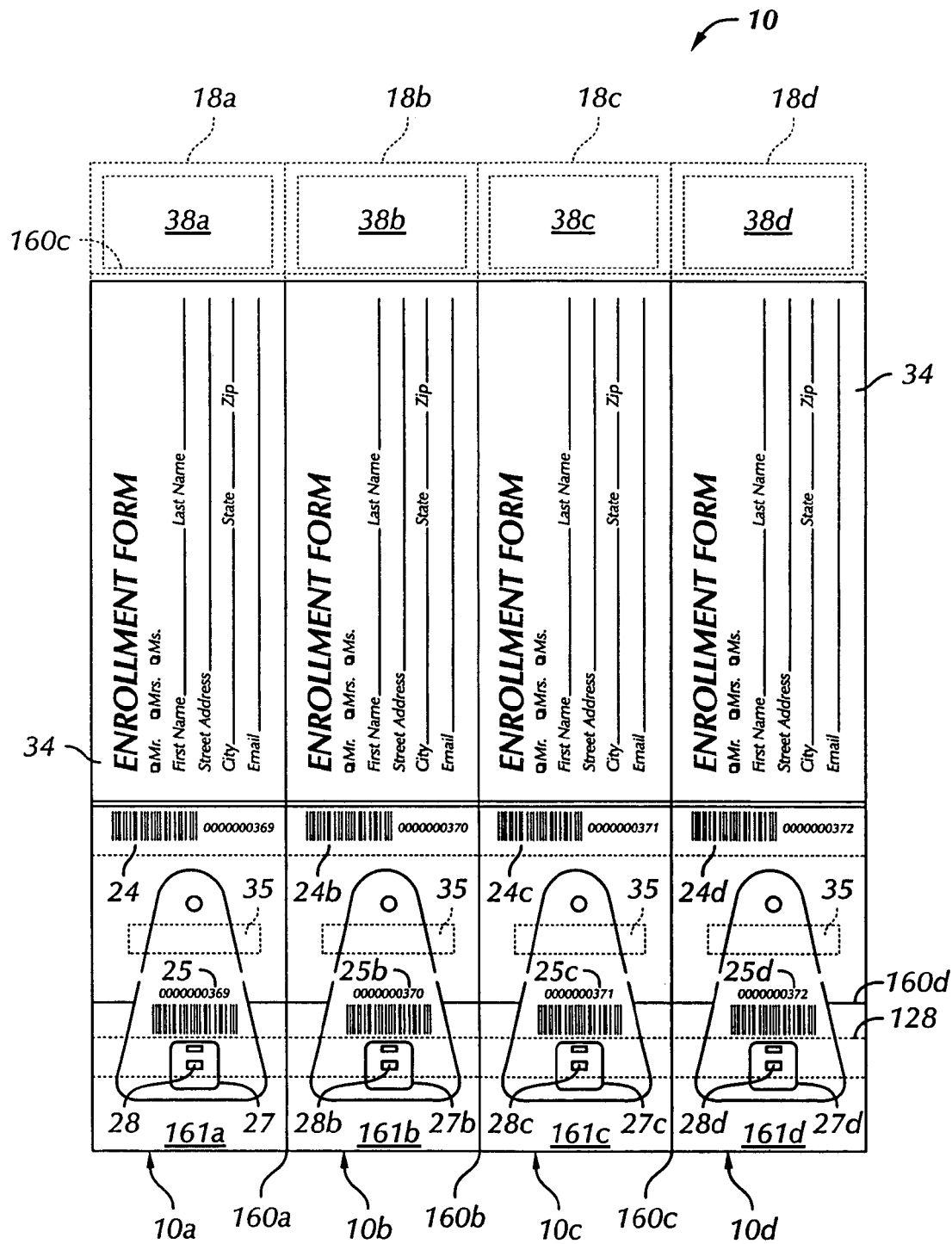
FIG. 3 is a plan view of another printed sheet product of the present invention incorporating the individual printed sheet product of FIGS. 1-2.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import. Furthermore, the term "electro/magnetic" is used to refer generally to devices that are electrical or magnetic or both and other than photonic in character, function and/or data storage or transmission.

In the drawings, like numerals indicate like elements. FIGS. 1 and 2 depict a multilayer, integral, individual printed sheet product 10a of the present invention which is an application form that maintains the integrity of the identification of uniquely encoded planar identification elements when the form is completed.

Individual printed sheet product 10a is merely one of a number which would be produced at the same time as a "collection" or "set" in a manner to be subsequently described, each with a different unique code (or codes). Individual printed sheet product 10a is depicted in FIG. 3 as part of a larger, printed sheet product 10 with other individual printed sheet products 10b-10d, which, with individual printed sheet product 10a, form a plurality. The plurality 10a-10d is part of a larger collection or set of individual sheet products 10a et seq., which typically number in the thousands and may even number in the millions.

The individual sheet product 10a of FIGS. 1-3 includes a planar, flexible, printable sheet core indicated generally at 12 having planar major opposing first and second sides 14 and 16, the first or "front" major planar side 14 being seen in FIG. 1. Core 12 may be formed from a single, integral, one-piece sheet of a single, uniform, printable material or, as is best shown in FIG. 2, core 12 may be formed by separate first and second printable core strips 18, 20. The core strips 18, 20 are each planar and flexible and, according to an important aspect of the invention, are of different materials each of which can accept printing. The strips 18 and 20 are fixedly secured together, generally edge-to-edge, side-by-side, to define a preferably monolayer core 12 of one thickness of material with a junction or joint 17. Only strip 18 forms the upper outer edge of core 12 in FIG. 1 and only strip 20 forms the lower outer edge. Machine or tractor feed holes (not depicted) can be located along the free side edge margins of each strip 18 and 20, respectively, (upper and lower margins in FIG. 1) for continuous manufacture of complete collections or sets of the individual sheet products from rolls of the strip materials. Alternatively, collections or sets of the individual sheet products 10 can be made from a plurality of sheets like sheet product 10 of FIG. 3, each of the same predetermined size (e.g., 8½×11, 14×17, etc.) and each of which constitutes a sheet product of the present invention.

Referring back to FIG. 1, the second core strip 20 is printed on the first major planar side 14 of the core 12 with at least one and, more typically, a plurality of spaced-apart, variable data fields. Two variable data fields are identified at 24 and 25. Each variable data field 24 and is printed with a unique code and the codes printed in the variable data fields 24-25 are identical, namely, "0000000369" in the indicated example. The variable data fields 24-25 constitute a set, each with the same unique printed code. Referring to FIG. 3, each other individual printed sheet product 10b-10d also has its own set of variable data fields: code fields 24b/25b; 24c/25c; and 24d/25d, respectively. Each set of the code fields is encoded with the same code unique to the set and different from each other set of printed codes of the sheet product 10 and of the larger collection of individual sheet products 10a et seq., only four of which are depicted. The location of the variable data fields 24-25 preferably remains the same in each individual sheet product 10a, 10b, etc. Only the unique code printed in the variable data fields would change from individual sheet product 10a to individual sheet product 10b, 10c, etc. The unique code may be printed in human readable characters or in machine readable formats, e.g., bar codes, or in both formats (as depicted) in either or both of the first and second variable data fields 24, 25. Preferably, all printed codes are capable of being optically as well as machine read. This construction permits all of the machine readable printed variable data fields to be located on one of two core strips used. Of course, if the core 12 is formed from a single strip of core material, variable data field 25 could be located anywhere on the sheet product 10a, including the opposite end (upper end in FIGS. 1-3) of the sheet product 10a.

In addition to the variable data fields 24-25, the sheet product 10 includes one or more printed static graphic fields with two fields 34, 35, being depicted on the first side of 14 of the core 12. The second side 16 of the core 12 typically includes at least one or more printed static graphic fields, two fields 36 and 37 being indicated in phantom block diagram form on FIG. 2. Field 35 is also indicated in phantom block diagram form in FIGS. 1 and 2. Static graphic fields generally may be a graphic image or text or a combination, which is typically repeated identically on each other individual printed sheet product 10b, 10c, etc. of the collection or set. The static graphic field(s) 34-37 typically would remain unchanged from printed individual sheet product 10a to printed individual sheet product 10b, etc. within a set or collection of such individual products 10a et seq. This is particularly true of static graphic fields of text providing information or creating forms. Decoration graphics need not be identical on each individual sheet product 10a but would typically be provided in a single pattern that might span several adjoining individual sheet products and then be repeated on consecutive adjoining individual sheet products thereafter. However, they carry no unique data. One of the advantages of the present invention is that its construction allows the printing of information (static graphic and variable data) on both sides of the sheet products and their various removable elements.

Static graphic fields 34, 35 are associated with the first and second variable data fields 24 and 25, respectively. Static graphic field 34 preferably is an identification block preprinted to indicate where on the first core strip 18, a name and address of an individual is manually entered to identify the individual to whom the individual sheet product and the unique code(s) of the individual sheet product 10a et seq. are assigned. The particular formats of the various static graphic fields 34-37 are not important to this embodiment of the present invention beyond the provision on the first planar strip 18 of a location (i.e., static graphic field 34) to manually enter an identification of an individual to whom the unique code(s) of the sheet product 10a et seq. is assigned.

Referring back to FIG. 2, a first cover strip indicated generally at 40 is integrally and permanently secured to the core 12 and preferably to each of the first and second core strips 18 and 20 preferably spanning joint 17 and holding the first and second core strips 18, 20 in generally edge-to-edge, side-by-side position as shown in FIGS. 1 and 2. Preferably, the first cover strip 40 only partially covers the first or "front" major planar side 14 of the core 12 but at least partially covers each of the first and second core strips 18 and 20 while extending completely across the first major planar side 14 and each of the first and second core strips 18 and 20 (left to right in FIG. 1). The "upper" edge of strip 40 is noted in FIG. 1 by the lead line from reference numeral 40. Preferably, the first cover strip 40 covers enough of each of the first and second core strips 18 and 20 to assure that each is permanently and integrally secured with the other. The first cover strip 40 may be provided by a polymer film 42 and an appropriate adhesive layer 44, preferably a heat or light activated adhesive for permanence.

In the depicted embodiment 10a, a second cover strip 50 is preferably provided, integrally secured to each of the first and second core strips 18 and 20, again only partially covering the second, "rear" major planar side 16 of the core 12 and each of the first and second core strips 18 and 20. Second cover strip 50 again preferably extends completely across the second major side 16 and each of the first and second core strips 18 and 20, again left to right in FIG. 1 but only partially along core 12 and core strip 18 in the vertical direction.

Individual sheet product 10a further includes a planar, electro/magnetic data storage element 28, which is encoded with a unique electro/magnetic code. The preferred data storage element 28 is a read only memory, which is part of a generally planar, radio frequency identification ("RFID") transponder assembly 27 configured to transmit an electro/magnetic signal containing the unique electro/magnetic code and possibly other information in response to a radiated, e.g., radio frequency ("RF") interrogation signal. Such RFID assemblies include an antenna and a small chip connected to the antenna. The chip includes the read only memory as well as RF receiver and RF transmitter circuitry and a power circuit configured to temporarily store energy from the received RF signal and use that energy to transmit the RF response. The assembly 27 may also include programmable (random access) memory and control circuitry. The assembly 27 is preferably permanently and integrally fixed together with at least one of the core 12 and the first cover strip 40, in product 10a on the first side 14 of the core 12, by being bonded between and with the polymer film 42 and the core 12 by the adhesive 44 of the first cover strip 40. The electro/magnetic transponder assembly 27 may be first "tacked" to the core 12 before the core 12 is joined with the first cover strip 40 or even before the core strips 18, 20 are joined. Such RFID assemblies 27 (also sometimes referred to as "inlays") are available from a variety of suppliers, including but not limited to, Motorola of San Diego, Calif.; Texas Instruments of Attleboro, Mass., Checkpoint Systems of Thorofare, N.J.; Gemplus Corp. of Redwood City, Calif.; Hughes Identification Devices of Tustin, Calif.; Cotag International of Wilmington, Del.; Abbhafo Incorporated of San Diego, Calif.; and Balough T.A G. of Ann Arbor, Mich. For example, Gemplus offered smart labels in three shapes: a small square approximately one-half inch square, a large square approximately one inch square and a small disk. All three sizes come in two versions, read-only and read/write. Each read-only version contains a unique, tamperproof code of sixty-four bits, which is directly programmed during manufacture. The read/write version has a 2 kb EEPROM memory that offers different access possibilities. Various additional shapes, sizes and/or capacities are and will be available and can be used. The smallest size is particularly useful on key tags and other smaller elements. Typically such devices require for interrogation the use of readers supplied by various manufacturers.

Still referring to FIG. 1, scoring indicated generally at 60a, 60b and 60c is provided in the sheet product 10a and extends at least sufficiently through and along the sheet product 10a and through the second core strip 20 and, in this embodiment 10a, through the provided first cover strip 40 and the second cover strip 50, where present, to define at least one identification element 62 removable from a remainder of the individual sheet product 10a. The scoring 60a and 60c further separates the second printed variable data field 25 from the other printed variable data field(s) 24.

The first removable identification element 62 is preferably planar and multilayer in construction and preferably includes at least the second variable data field 25 of the plurality of variable data fields 24-25 but only a portion of second core strip 20, the first cover strip 40 and the second cover strip 50, if provided. Preferably, one or more narrow bridges of continuous material 64-66 spanning the first removable element 62 and the remainder of the sheet product 10a releasably retain the first removable element 62 in the sheet product 10a until removed. Preferably, another portion 60b of the scoring defines a closed perimeter opening 68 entirely within and entirely through the first removable element 62 to enable the element 62 to be attached to a key ring, key case or other key holder (none depicted).

Although the element 62 is generally triangular in shape, a variety of other shapes, both non-rectangular and rectangular, could be used, although non-rectangular shapes are more distinct, and sometimes easier to use. Preferably key tag element 62 is smaller in size than a conventional credit or business card which are typically about three and three-eighths by two and one-eighth inches or more in size, with a maximum planar diagonal dimension of about three and seven-eighths inches in length. Key tag 62 is smaller than that having a maximum dimension in the plane of the tag 62 of less than three and one half inches and having no second dimension in the plane of the element 62 in a direction perpendicular to the maximum dimension greater than two inches.

Still referring to FIG. 1, according to another important aspect of the present invention, the scoring preferably further includes a line of perforations 60c (or other line of weakness), which extends across the sheet product 10a and sufficiently through the second core strip 20, the first cover strip 40 and/or the second cover strip 50, where provided, to define first and second separable sheet components 72 and 74. At least one of the printed variable data fields, the first variable data field 24 in this embodiment, is separated from the removable identification element 62 and is left on an integral remainder of the individual sheet product 10a which includes the first core strip 18. The first separable sheet component 72 is integral and includes the entirety of the first core strip 18 and a portion of the second core strip 20 including the first printed variable data field 24. The second separable component 74 includes the removable identification element 62 and a scrap portion 20a of the second core strip 20, which is connected to and releasably retains the removable identification element(s) 62. The second separable component 74 can be separated from the first component 72 and given to a customer or client who keeps the removable identification element(s) 62. The first separable sheet component 72 is retained with identification information of the individual to whom the second separable sheet component 74 was given manually entered into the static graphic field 34. The first variable data field 24 with the unique printed code remains attached with the individual identification information manually entered into the static graphic field 34 and is kept as a permanent record by the sheet product provider. In this way, identification element(s) with pre-entered electro/magnetic codes can be easily assigned to randomly appearing individuals at a retail point of distribution and a record of that assignment easily made.

Specific manufacturing details and materials, including suggested materials and manufacturing techniques, as well as other configurations of printed sheet products including removable planar, printed identification elements have been disclosed in prior U.S. Pat. Nos. 4,978,146, 5,495,981 5,743,567, 5,769,457, 5,863,076, 6,010,159 and/or 6,039, 356, and Application Nos. 60/126,476 filed Mar. 26, 1999, 60/139,684 filed Jun. 16, 1999, 60/401,789 filed Aug. 7, 2002, Ser. No. 09/532,113 filed Mar. 21, 2000, and Ser. No. 09/595,825 filed Jun. 16, 2000, each of which is incorporated by reference herein in its entirety. Suggestedly, first core strip 18 comprises and, preferably, consists essentially of cellulose material, namely paper stock, to reduce the overall cost of the product 10a. The second core strip 20 preferably comprises a polymer material stiffer and thicker than the paper sheet stock to provide stiffness and thickness to the removable key tag (or card) element(s) 62 yet still flexible for processing. The polymer material is one that accepts printing, preferably one which accepts laser printing. Strip 20 preferably consists essentially of a porous, specifically microvoided, polymer sheet material such as Teslin® of PPG Industries, Pittsburgh, Pa., or Artisyn® of Daramic, Inc., Charleston, S.C., both microvoided, polysilicate sheet materials for laser printing. Teslin® is described in detail in U.S. Pat. No. 4,861,644, incorporated by reference herein. See also published U.S. Application No. 2001 0023014 also incorporated by reference herein. Teslin® is relatively very porous with a porosity of more than fifty percent.

The second cover strip 50 on the second or rear major planar side 16 of the planar core 12 suggestedly comprises and preferably consists essentially of a transparent polymer film carrier 52 bonded to core 12 with an appropriate adhesive 54 and is the preferred cover strip used to join the two core strips 18, 20 together at joint 17. This permits laser printing of variable data fields and installation of RFID assemblies 27 directly on the first side of the core 12, if desired before attachment of the first core strip 40. Polyester provides good strength, wear and soil resistance properties to the outer surface of each of the removable element(s) 62 etc. However, if durability of the removable element(s) is not a factor and reduced cost would be advantageous, the polymer film carrier 52 of the second cover strip 50 can be a less expensive material such as conventional cellophane or 3M brand Magic invisible or transparent tape or any of their industry equivalents with a pressure sensitive adhesive sufficient to hold the core strips together, at least until the first cover strip 40 is applied spanning the joint 17. At least the first cover strip 40 on the first (front) major planar side 14 of the core 12 and individual sheet product 10a would suggestedly be a more durable, polyester material that is transparent to visible light or at least infrared light so that the variable data fields 24, 25, etc. beneath the cover strip 40 can be seen by humans, if desired, or at least read by machine such as by an infrared scanner.

While both strips 40, 50 are shown to extend over the junction 17 between the first and second core strips 18 and 20, only one of the two cover strips 40 or 50, if it is actually used as the sole means to join the first and second core strips 18, 20 together, need span the junction 17 for purposes of the present invention. Similarly, cover strip 50 need not be provided at all. The primary purpose for providing second cover strip 50 is to protect the rear face of the removable element 62 and to further prevent tampering with the printed fields on that side of the element. For that purpose, second cover strip 50 need only span the second core strip 20 overlapping the scoring 60a defining the removable card element 62. The upper edge of one of the cover strips 40, 50 might, for example, terminate at a location between the scoring 60a and the first printed variable data field 24, or at a location just above variable data field 24 spanning the scoring 60a-60c and first variable data field 24, if that field is to be protected as well. If desired, the upper edges of both cover strips 40, 50 can be terminated between scoring 60a and data field 24 and another adhesive strip, e.g., transparent tape, used to join the core strips.

Figure 4:
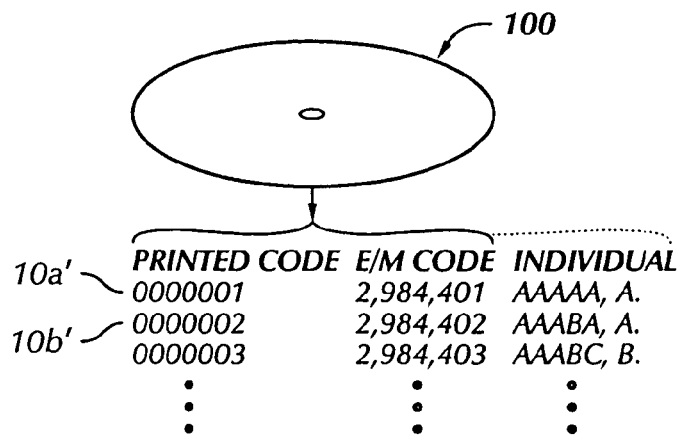
FIG. 4 depicts diagrammatically a separate portable data storage element storing at least the unique codes of the individual printed sheet products of FIGS. 1-3.

FIG. 3 depicts yet another printed sheet product 10 of the present invention, which is formed by a plurality of individual sheet products 10a, 10b, 10c and 10d, respectively. The sheet product 10 is printed with a plurality of sets of variable fields, four being shown: 24/25; 24b/25b; 24c/25c; and 24d/25d. The printed codes of each set 24/25, 24b/25b, 24c/25c and 24d/25d, are identical in the set, unique to the set and to the individual printed sheet product 10a, 10b, 10c, 10d and differ from each other unique set of printed codes of each other individual printed sheet product 10a et seq. of the set. The same is true for the data storage elements 28, 28b, 28c and 28d. Each such data storage element 28, et. seq., is encoded with its own unique electro/magnetic code, which differs from the electro/magnetic code of each other element 28, 28b-28d and that of each other data storage element in the total set or collection of individual sheet products of which products 10a-10d are part. The printed sheet product 110 further indicates the locations of additional score lines 160a-160d which define and separate individual printed sheet products 10a-10d from one another and from any remainder of the overall sheet product 110, such as sections 161a-161d, which are scrap. Also the core strip 18 may be made bigger to provide extended areas 18a-18d on each removable element 10a-10d, preferably with another static graphic field 38a-38d, respectively, which might be a logo or instructions or a coupon, etc. and may be made removable by score line 160e (in phantom). Equipment to write codes on and/or read codes from magnetic strip 128 can be obtained from any of a variety of domestic and foreign manufacturers, including, but not limited to, Axiohm American Magnetics of Cypress, Calif., Mag-Tek, Inc. of Carson, Calif. and Atlantic Zeiser of West Caldwell, N.J.

Where the unique electro/magnetic code of each individual sheet product 10a et seq. is different from the unique printed code, a master data set must be provided linking the two codes (electromagnetic/printed) with one another and, if known, with any individual to whom the individual sheet product 10a-10d and thus the unique printed and electro/magnetic codes of that individual sheet product are assigned. This may occur because some transponder manufacturers will only ship electro/magnetic data storage assemblies precoded according to their own code schedules. This is expected to change. Alternatively, the assemblies can be obtained with programmable memories allowing other data, including other codes, to be written into data storage. FIG. 4 depicts diagrammatically a separate, preferably portable data storage element 100 storing at least the unique printed code and the unique electro/magnetic code of each individual sheet product 10a et seq. in a single data set. This information may be further combined with an identification of an individual person assigned the individual printed sheet product 10a et seq. and the two codes (printed and electro/magnetic) organized in a manner such that at least the two codes (printed and electro/magnetic) of each individual sheet product 10a et seq. and, where available, the identification of the individual person assigned the codes and the individual sheet product, can be identified from among pluralities of unique codes (printed and electro/magnetic) and preferably a plurality of individual person's identifications on the portable data storage element 100. The printed codes of sheet products 10a-10c are indicated diagrammatically at 10a'-10c'. The portable data storage element 100 might be any element with adequate data storage including an optical disk, a floppy disk, a hard drive, a magnetic tape, a programmable memory (e.g., ROM, RAM), etc. Alternatively, the information may be stored in a memory and accessible by phone, Internet link, satellite link, etc., to correlate the codes to an individual's identity or vice versa. This can be done as a separate step or while accessing a central data base of customers to add additional information to that maintained on the individual, for example, product purchases, visits, etc. The printed codes and electro/magnetic codes of each individual sheet product may be related to one another by an algorithm, including a one-to-one algorithm for identical printed and electro/magnetic codes on each individual sheet product. Alternatively, the codes can be random and would have to be related to one another in sets in the other data storage element 100.

A collection of the individual sheet products 10a et seq. might be manufactured from pluralities of cut, printed sheet products like sheet product 10 of FIG. 3 or may be made continuously from rolls of flexible component stock. Parallel alignment of the core strips 18, 20 and first and second cover strips 40 and 50 permits such a continuous manufacture. The RFID transponder assemblies 27 may be supplied on a suitable continuous carrier, for example a thin polymer or cellulose strip (not depicted), with the assemblies fastened to the strip at uniform spacing preferably to coincide with the appropriate position of such assembly on the individual printed sheet product 10a, etc. on a cut sheet like product 10 of FIG. 3 or on a continuous web. See, in particular, previously referenced U.S. Pat. Nos. 5,769,457, 5,863,076, 6,010,159 and 6,039,356 for details of the cut sheet and continuous strip manufacture of individual printed sheet products 10a et seq.

Figure 6:
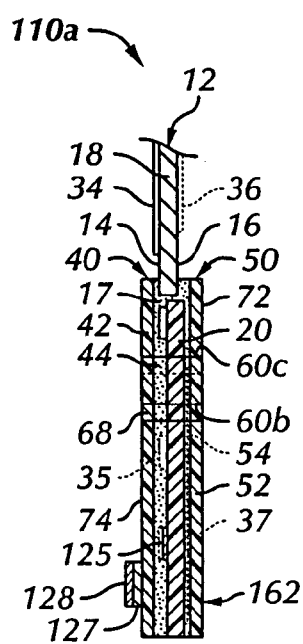
FIG. 6 is a cross section of FIG. 5 taken along the lines 6-6 in FIG. 5.

FIG. 5 is a plan view of FIG. 1 of an alternate individual printed sheet product 110a including a different type of planar electro/magnetic data storage element 128. Apart from the changes associated with this data storage element 128 and the different variable printed code fields 124/125, the individual printed sheet products 10a, 110a are essentially identical in composition, form and use. The differences between the products 10a and 110a are best seen in FIG. 6, a cross-sectional view of the lower portion of FIG. 5. Everything above the joint 17 in both products 10a, 110a is identical.

Referring to FIG. 6, integrally and permanently applied over the outer side of first cover strip 40 is the planar data storage element 128 in the form of a conventional magnetic strip, which is fixed permanently and irremovably to the outer surface of first cover strip 40 by suitable means such as an adhesive layer 127. Magnetic strip 128 can be electro/magnetically encoded with and can store a unique electro/magnetic code, as well as further information if a sufficient amount of the magnetic strip 128 can be provided on the removable element 162. Unlike the limitations of the RF transducer data storage element 28, the magnetic strip 128 can easily be magnetically encoded during manufacture of the sheet products 10a, etc. with the same unique code printed in each of the variable data fields 124, 125 of the individual sheet product. In addition to this construction, it should be appreciated that the magnetic strip 128 can be embedded in an otherwise thin transparent cover strip and applied to the core as a single, composite cover strip (neither depicted). Pluralities of such individual sheet products can be fabricated together in the manner described with respect to FIG. 3 by substituting a continuous magnetic strip 128 (in phantom in FIG. 3) spanning the individual sheet products. Where a removable identification element includes either a printed unique machine readable code (e.g. 24) or magnetic stripe (e.g. 128) proximal an edge of a removable identification element (e.g. 162), the closed perimeter opening (e.g. 68) should be located at least one-half inch or more from an edge of the element along which the magnetic stripe (128) extends and at least one inch from any edge that the printed machine readable code (25, 125, etc.) adjoins or that a magnetic strip adjoins between the printed machine readable code and the edge. This is so that the opening (68) does not interfere with the operation of a mag stripe or bar code swipe reader through which the element is passed. According to another important aspect of the invention, an RFID transponder assembly like assembly 27 in FIGS. 1-3 can be provided in removable element 162 permanently and integrally fixed to the element, preferably between core strip 20 of core 12 and one of the cover strips 40, 50.

FIGS. 7 and 8 are plan views and FIG. 9 is a cross-sectional view, respectively, of yet a third embodiment, multilayer, integral, individual printed sheet product of the present invention indicated generally at 210a. It should be appreciated that individual printed sheet product 210a is substantially similar to that portion of individual printed product 10a of FIGS. 1-4 below the junction 17 to which an additional element, an exposable, adhesive layer 280, has been added. Referring particularly to FIG. 9, layer 280 is preferably a pressure-sensitive adhesive, and is further provided with a protective release strip 282 overlying the layer 280 until it is desired to expose the adhesive layer 280 for use. Scored key tag 262 constitutes the first identification element removable from the individual sheet product. The portion of the individual sheet product 210a above the score line 60c, including the first variable data field 24 with unique printed code and the exposable adhesive layer 280, constitutes a second planar identification element 270 removable from the remainder 261 of the individual printed sheet product 210a. The second removable identification element 270 can be used as a label, for example, attached to a separate enrollment card or enrollment sheet containing an identification of the individual person to whom the remainder of the individual printed sheet product 210a with first removable element 262 is provided. If desired, a line of scoring 60d can be provided across either side of removable element 262 to remove end 261a of the sheet product during manufacture.

Figure 10:
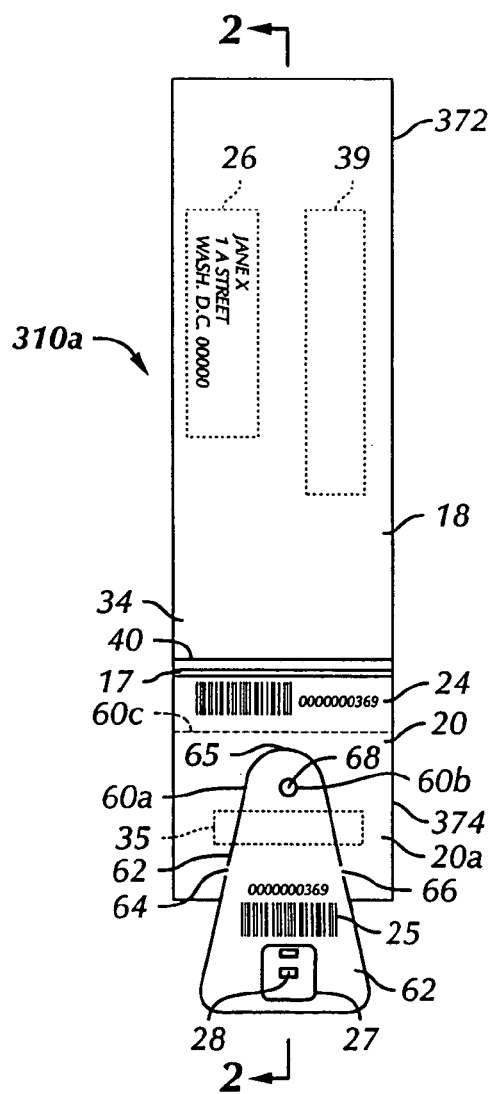
FIG. 10 is a plan view of a fourth embodiment exemplary individual printed sheet product with integral, removable, electro/magnetic identification element.

FIG. 10 is a plan view of a fourth embodiment, individual printed sheet product indicated generally at 310a, which is substantially identical to individual printed sheet product 10a of FIGS. 1-3 but for the substitution of a new static graphic field 39 and a new variable data field 26 containing preprinted information of the unique individual person to whom the printed sheet product 310a and the unique printed code of the other printed variable data fields 24/25 and the unique electro/magnetic code of the planar electro/magnetic data storage element 28 are assigned. Element 310a is preferably sized to be slightly smaller than and essentially fully fill a standard size envelope (e.g., No. 9) without bending or significant movement of the sheet product 310a within the envelope so that the name and address of field 26 can be viewed through a window of the envelope (not depicted). A new first separate sheet component 372 is thus provided. It will be appreciated that variable data field 24 could be deleted in view of field 26 and another identification element (key tag or card) provided between the existing key tag 62 and printed fields 26 and 39. Also, a magnetic storage element/strip 128 like that in FIGS. 5-6 can be added to or over either cover strip 40, 50 of the third embodiment printed sheet product 210 of FIGS. 7-9 or an RFID transponder assembly 27 added to the fourth embodiment 410a of FIGS. 11-12 to provide the two separate electro/magnetic data storage devices on the removable element 262 or 126.

It will be apparent that various modifications could be made to the individual sheet product 210a. For example, either or both of the first and second cover strips 40 and 50 can be terminated short of the first variable data field 24 and line of perforations 60c as they are not needed to secure two core strips together. This is exemplified in another possible sheet product embodiment 410a, which is depicted in plan view in FIG. 11 and cross-sectional view in FIG. 12. Sheet product 410a further differs from sheet product 210a in the substitution of magnetic strip 128 for transponder assembly 27 as done with the second embodiment 210a. Given the fact that a unique code is encoded either into the memory 28 of the transponder assembly 27 or on the magnetic strip 128, it will be appreciated that, if desired, printed variable data field 25, 125 can be omitted from the removable element 62, 162, 262. On the other hand, the line of perforation 60c of FIGS. 1-2 and 7-9 can be converted into a complete cut 60e as in FIGS. 11 and 12 and a larger adhesive layer 480 and protective release strip 482 can be applied to span the complete cut 60e to releasably hold the second removable identification element 470 with the remainder of the printed sheet product 410a, which is provided by second separable component 474 that includes key tag 162 and remainder 461. Alternatively or in addition, adhesive layer 480 and protective strip 482 can be applied further along the sheet element 410a as shown in phantom in FIG. 12 at 480' and 482' to span at least a proximal (upper) portion of the first removable element 162 to releasably secure each such element in the sheet product 410a. Again, an RFID transponder assembly 27 can be added to the removable element permanently and integrally fixed together with the core 12 and one of the cover strips 40, 50.

Figure 14:
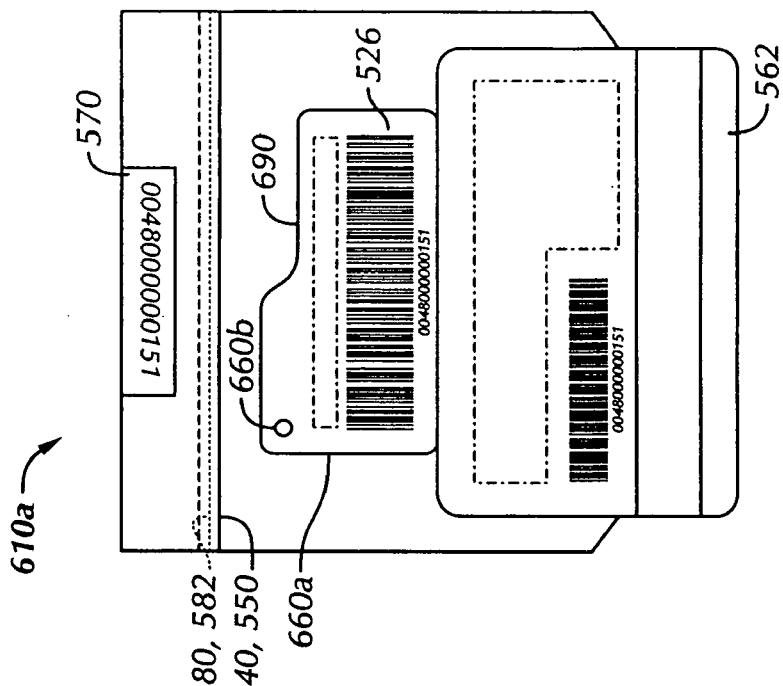
FIG. 14 is a plan view of a seventh embodiment exemplary individual printed sheet product of the present invention.
Figure 13:
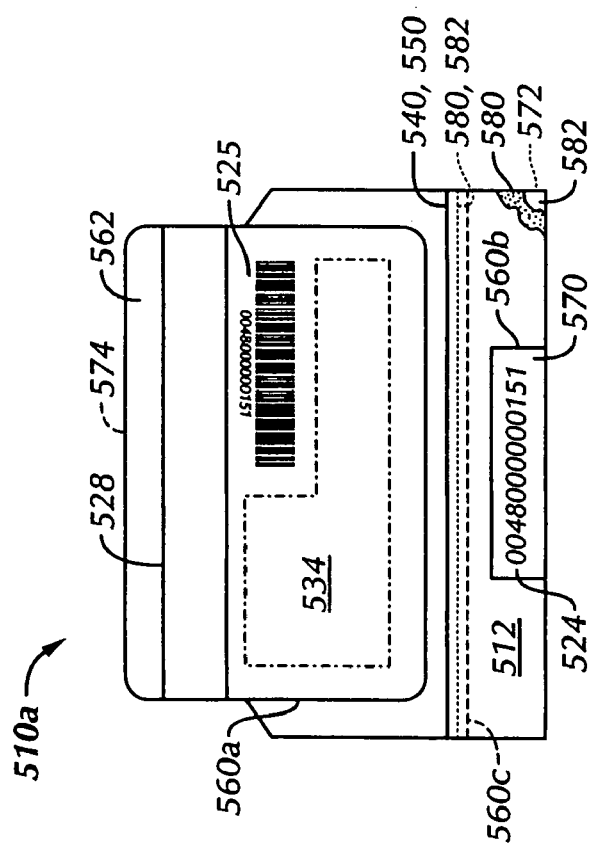
FIG. 13 is a plan view of a sixth embodiment exemplary individual printed sheet product of the present invention.

A larger, rectangular transaction card 562 can be substituted for the key tag 262 or a combination of planar, rigid, identification elements (card(s) and/or tag(s)) provided with the labels 570 as shown in FIGS. 13 and 14, which depict exemplary individual sheet product embodiments 510a and 610a, respectively.

Embodiment 510a of FIG. 13 includes a removable card element 562, a removable label element 570 separated from one another and a remainder of the individual sheet product 510a by scoring 560a and 560b, respectively. Variable data fields 524 and 525 are printed on a core 512, which is exposed on and around label element 570. The removable card element also bears magnetic strip 528 and printed static graphic field 534. One or more other static graphic fields are typically provided on the hidden major side of sheet product 510a. The overlapping lower boundaries of first and second cover strips 540/550 on the depicted and opposing major sides, respectively, are indicated in solid while the overlapping upper boundaries of the exposable adhesive layer 580 and overlying protective release strip 582 on the hidden major side of the sheet product 510a are indicated in phantom. Cover strips 540, 550 extend across product 510a completely covering both major sides of card 562. If desired, an additional line of scoring 560c can be provided to permit the sheet product 510a to be broken into first and second separable components 572 and 574 indicated (in phantom).

Embodiment 610a in FIG. 14 includes a removable card element 562 and a removable label 570 identical to that of FIG. 13 and further includes a third removable element, a key tag 690, with a third printed variable data field 526 bearing the same unique code as code fields 524 and 525. Key tag 690 is defined by scoring 660a, 660b. If desired, a second key tag could be formed nested with key tag 690 to provide three card and key tag identification elements. Again, individual sheet products 510a and 610a are designed so that each magnetic strip(s) and exposable adhesive layer(s) and protective release strip(s) can be laid with cover strips on a printed core to produce many side-by-side, individual sheet products at one time, either on cut sheets or continuous rolls of core material.

FIGS. 15 and 16 show other, related individual sheet product embodiments 710a and 810a. Sheet product 710a in FIG. 15 includes a removable card element 762, a removable label 770 and a removable key tag element 790 in another possible configuration. Each removable element bears a separate printed variable data field 724, 725 and 726, respectively, preferably in both character and bar formats. As is indicated, a first magnetic strip 728 is applied to span removable key tag element 790. A second magnetic strip 778 may be applied in addition or in the alternative and spans the removable card element 762. Finally, exposable adhesive layer 780 with protective release strip 782 are applied to the opposite major side of the sheet product 710a underlying the removable label 770. Cover strips 740, 750 can span the entire sheet product as indicated or portions of the product 710a including card element 762 and key tag elements 790. Individual sheet product like 710a could be made in continuous strips, side-by-side and separated by scoring after completion utilizing continuous lengths 728, 778 of the magnetic strip material and exposable adhesive layer 780 and protective release strip 782 material. Scoring 760a, 760b defines key tag 790; scoring 760c defines removable label 770 while scoring 760d defines removable card 762. Additional scoring 760e, 760e' and 760f, 760f' can be provided to define removable scrap portions or elements 761, 761'. Sheet product 810a in FIG. 16 is identical to sheet product 710a of FIG. 15 but for the addition of a second removable key tag element 790' defined by scoring 760a', 760b' and bearing printed variable data field 726' and a portion of magnetic strip 728. Again, it will be appreciated that the various removable identification elements 562, 762, 790, 790' can be provided with an RFID transponder assembly 27a, etc. in place of or in addition to the indicated magnetic strip data storage element 528, 728, 778.

In addition, it will be appreciated that still other, different combinations of removable elements including combinations with multiple key tags, cards, labels, advertisements, application forms, etc. and other printed variable and static-graphic data fields can be provided in different configurations of the individual sheet products.

The uniquely, electro/magnetic encoded, identification elements of the above-described embodiments of the present invention offer certain advantages over such elements which are uniquely encoded with only conventional, optically read, printed bar coding. First, they can provide greater data storage in a given area. Second, they offer the capability to rewrite some of the data being stored, so that the card can be used transactionally. Third, because they contain their own unique machine readable code, they do not actually require printed codes (e.g., 25, 125, 525, 725, 726, 726'). Such codes can, however, be useful at point of sale locations and to easily identify one unique code assigned to the individual receiving the individual sheet product. Finally, identification elements with the RF transducer assembly can be read remotely, that is without having to be physically swiped through a reader. Some systems are sufficiently powerful to be able to interrogate and respond, even without being removed from a pocket or purse, and provide even greater flexibility for customer or client identification and for financial transactions (e.g. credit and debit cards).

Figure 20:
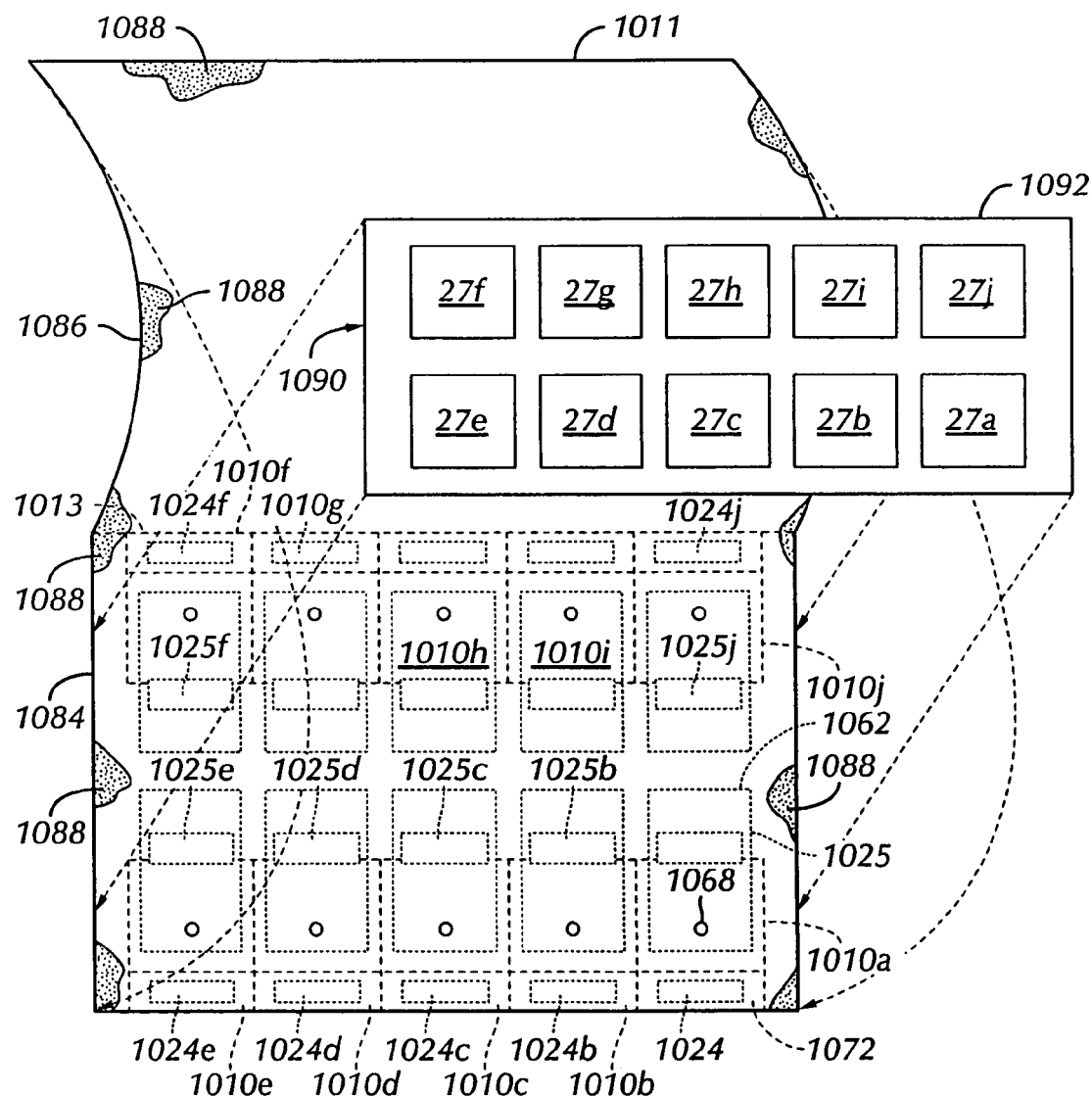
FIG. 20 is a perspective view of an initial stage of assembly of an intermediate sheet product used to make a plurality of the embodiments of FIGS. 17-19 at the same time.

FIGS. 17-19 are plan, cross sectional and opposite plan views, respectively, of a tenth embodiment, multi-layer, integral, individual printed sheet product of the present invention indicated generally at 1010a. Sheet product 1010a is merely one of a number that would be produced at the same time as a collection or set as depicted in connection with FIGS. 20-21. Referring to the FIG. 18 cross section, the individual sheet product 1010a includes a planar, flexible, printable sheet core indicated generally at 1012 having major planar opposing first and second sides 1014 and 1016, a first major planar side 1014 being seen in FIG. 17 and the opposing, second major side 1016 being seen in FIG. 19. Core 1012 is preferably provided by separate first and second printable core strips 1018, 1020 which are planar, flexible and accept printing, and preferably are the microvoided, polysilicate sheet materials previously mentioned. The core strips 1018, 1020 are overlapping and coextensive in the product 1010a. Core strips 1018, 1020 can be joined together with and by any means suitable for the materials selected and as intended. Preferably the microvoided polysilicate materials are permanently bonded together with a layer 1019 of suitable adhesive material such as WC9-PL, a heat activated, water based polyurethane adhesive of the Thomley Company of Wilmington, Del. Sandwiched between the core strips 1018, 1020 is a radio frequency transponder assembly 27, which is preferably permanently and integrally fixed together with each of the core strips between the core strips 1018, 1020. Again, assembly 27 includes electro/magnetic memory portion 28 (in phantom in FIG. 17) containing the unique electro/magnetic transponder code. Preferably, first and second cover strips 1040, 1050 are again integrally and permanently secured to the outer facing sides 1014, 1016, respectively of the first and second core strips 1018, 1020, respectively. Each cover strip 1040, 1050 preferably is transparent and extends at least transversely entirely across the individual sheet product 1010a on the first and second major planar sides 1014, 1016, respectively, of strips 1018, 1020 of the core 1012. At least one and, more typically, a plurality of spaced-apart, variable data fields, e.g., 1024 and 1025, are printed on the core 1012 with a unique sixteen digit printed code which is identical to one another, namely "4215 6532 8745 9321" in this example. The variable data fields 1024, 1025 constitutes a set, each with the same unique printed code. Referring to FIG. 20, each other individual printed data sheet product 1010b-1010j of the collection or set of such individual products has its own set of variable data fields 1024b/1025b, 1024c/ 1025c, etc., each coded with the same code unique to that set and different from that of each other set of printed codes of the larger sheet product 1010 and larger collection of individual sheet products 1010a, etc., only ten of which are depicted. Again, each element may include a printed variable data field with other data unique to the set such as name and address or social security account number of the recipient. The location of the variable data fields 1024, 1025 with printed codes preferably remains the same in each individual sheet product 1010a, 1010b, etc., of the set. Only the unique code printed in the variable data fields with printed codes would change from individual sheet product 1010a to individual sheet product 1010b, etc. Again, the unique code is printed in human readable characters or numbers, or in machine readable format (e.g. bar codes) or in both formats (as depicted) in some of all of the variable data fields 1024, 1025. In addition to the variable data fields 1024, 1025, etc., the printed sheet product 1010a includes one or more static graphic fields with an individual field 1034 being identified on side 1014 and with all or substantially all of the exposed side 1016 being covered by a single large static field covering or essentially covering the second major planar side 1016, which typically would be the decorated "front" side, or a plurality of individual static graphic fields as indicated in phantom at 1036, 1037. It should be appreciated that this does not preclude a static graphic field from differing in appearance from element to element as where a large overall static design is applied to blocks of the individual elements (e.g., 1010a-1010j) so no static graphic field is the same from element to element. However, such difference static graphics fields carry no information unique to the card, which could be used to uniquely identify the holder of the card. In the same way, not all printed information is variable data. The name of the entity issuing the sheet products 1010a, etc., which appears on all of the products, is not variable data which can be used to uniquely identify the individual issued on individual sheet product 1010a or 1010b etc.

Scoring, indicated generally at 1060a, 1060b and 1060c, is provided in the sheet product 1010a and extends at least sufficiently through and along the sheet product 1010a and through the core 1012 and through the first cover strip 1040 and second cover strip 1050, where present, to define at least one identification element 1062 removable from a remainder of the individual sheet product 1010a. Scoring 1060a and 1060c further separates the second printed variable data field 1025 from the other printed variable data field(s) 1024.

The first removable identification element 1062 is, again, preferably planar and multi-layer in form and preferably includes at least the second printed variable data field 1025 of the plurality but only a portion of the core 1012 and core strips 1018, 1020, the first cover strip 1040 and second cover strip 1050, if provided. As depicted, cover strips 1040, 1050 extend entirely across the sheet product 1010a in a transverse direction but not in the longitudinal direction. At least the first cover strip 1040 could be extended as indicated in phantom at 1040' to cover the remaining printed variable data field 1024 to provide long term protection to that data field. The second cover strip could also be extended but such extension is also unneeded in this sheet product. Preferred again, one or more narrow bridges of continuous material 1064-1066 spanning the first removable element 1062 and a remainder of sheet product 1010a releasably retain the first removable element 1062 in the sheet product 1010a until removed. Preferably, another portion 1060b of the scoring defines a closed perimeter opening 1068 entirely within and through the first removable element 1062 to enable that element 1062 to be attached to a key ring, key case or other key holder (none depicted). Again, element 1062 is smaller in size than a conventional credit or business card each of which is typically about three and three-eighths inches by two and one-eighth inches in size. Key tag 1062 preferably but not necessarily has a length of about two and one half inches and a height of about one and five-eights inches providing a maximal diagonal dimension between opposing corners of about three inches or less (2.98"). Again, the element 1062 has no dimension in the plane of the elements in a direction perpendicular to the maximum diagonal dimension greater than two inches. These dimensions make element 1062 an essentially reduced size version of a standard sized credit/debit (CR80) card.

The remaining line of scoring 1060c is preferably a line of perforations, but could be another form of a line of weakness, which extends across the individual sheet product 1010a and sufficiently through the core strip 1012, first cover strip 1040 and/or second cover strip 1050, where provided, to define first and second separable sheet components 1072, 1074, one of which 1072 is a second removable identification element in the form of an adhesive label bearing at least the printed first data field 1024. The remainder of portion 1074 excluding element 1062 is scrap.

In addition to the radio frequency transponder assembly 27, which includes an electro/magnetic data storage element 28a, removable identification element 1062 is preferably provided with a magnetic strip data storage element 128 encoded with its own unique electro/magnetic code, which differs from the electromagnetic code of the magnetic strip data storage element of each other individual sheet product 1010b, etc. of the set. The unique code is preferably the same as the unique printed code, i.e. the code of variable data fields 1024, 1025, but may be the same as part or all of the code of the transponder assembly 27 or have both codes or have coding entirely different from each printed variable data field code and each of transponder code of the set of individual elements 1010a, etc.

Figure 21:
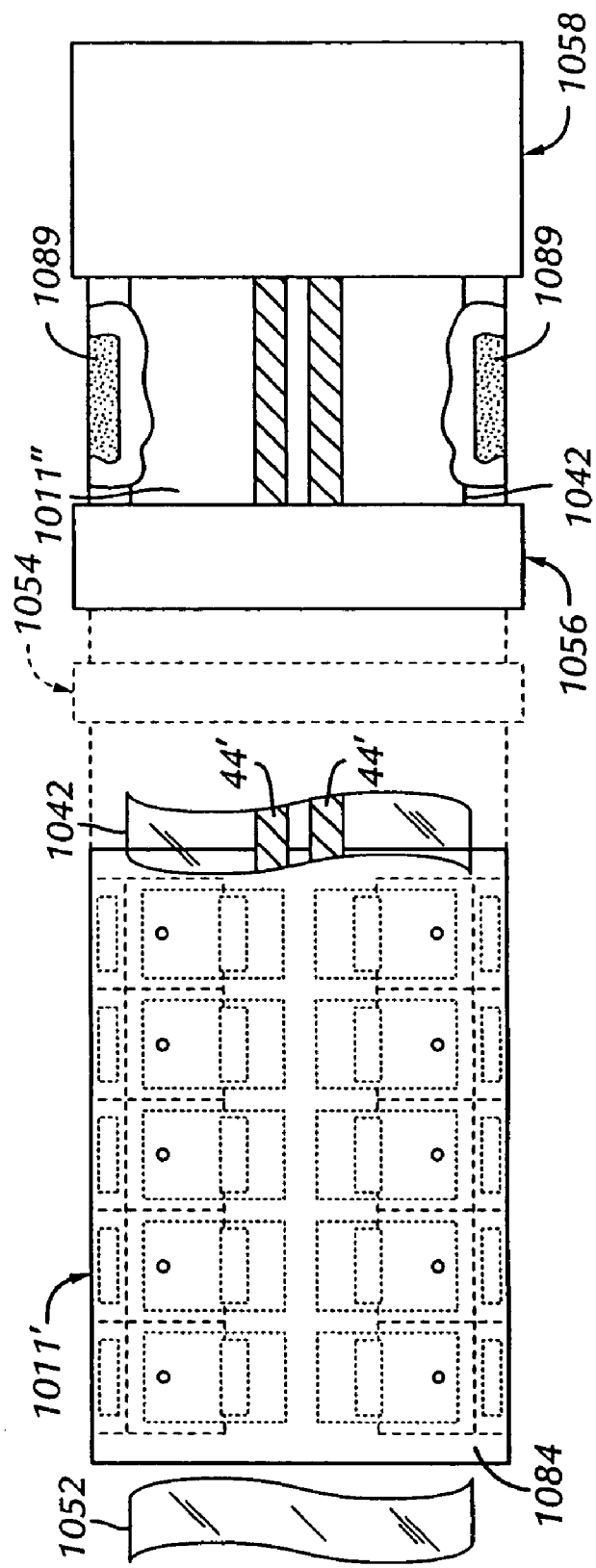
FIG. 21 is a subsequent stage of assembly using the intermediate sheet product of FIG. 20 to make the plurality of individual sheet products like that of FIGS. 17-19.

FIGS. 20 and 21 depict a suggested method of construction of plurality of the individual sheet elements 1010a, etc., in particular 1010a-1010j. A single sheet 1011 of the preferred, microvoided, polysilicate material twice the needed width, is made foldable by a line of perforations 1013 along its center so as to divide the sheet 1011 into two leaves 1084, 1086. The outer side of the sheet 1011, hidden in FIG. 19, is preferably preprinted with both static graphic and variable data fields before assembly. Printing on the two leaves 1084, 1086 can be different or identical or may be provided on only one leaf. Preferably, a suitable adhesive such as WC9-PL, identified above, is applied as a layer 1088 on the inner side sheet 1011 exposed in FIG. 20. This adhesive is tacky when dried after application but before heat activation, so that a separate sheet 1090 containing ten RFID transponder assemblies 27a-27j on a carrier 1092 such as a thin sheet of polyester, can positioned over the exposed inner side of the first leaf 1084 such that each transponder 27a-27j will lie within the interior of each of ten individual sheet products 1010a-110j, respectively, the outlines of which are indicated in broken lines in FIG. 20. It may be desirable to individually place assemblies 27a-j etc. between the leafs 1084, 1086, trimmed so as to lie well within the margins of each first removable element 1062 so that the sheets 1084, 1086 can bond directly together entirely around the assemblies for each element. This might be done automatically by scoring or perforating around each transponder 27a-27j and punching the transponders from the carrier 1092 onto leaf 1084 (or 1086) with tacky exposed adhesive. The outlines of variable data fields 1024, 1024b, etc. and 1025, 1025b, etc. as well as the first removable identification element 1062 and the second removable identification element 1072 are indicated for element 1010a and others of the elements 1010b-j. After the transponders 27a-27j of sheet 1090 are applied to leaf 1084, the remaining, second leaf 1086 is folded over onto the inner side of leaf 1084 with the transferred transponders 27a-27j. The remainder of carrier 1090 can be discarded. Thereafter, as shown in FIG. 21, a first continuous transparent cover sheet 1042, portions of which become the first cover strip 1040 of each individual sheet product 1010a, etc. and a pair of separate, continuous magnetic stripes 44' integral with a continuous transparent cover sheet 1042 is applied to the outer side of interim sheet product 1011' produced by the steps illustrated in FIG. 20. The outer side of leaf 1084, which outer side constitute major planar side 14 of each of the individual sheet products 1010a-j, is depicted. A second continuous cover sheet 1052 may be applied to the other outer surface of interim sheet product 1011' (i.e. the outer side of leaf 1086), which becomes the major planar side 1016 of each individual product 1010a-j. Preferably temperature activated, water based adhesives for the particular sheet materials selected are used to apply the various cover sheets 1042, 1052 (and magnetic data stripe(s), if separately applied provided). "MR", a heat activated adhesive from Transilwrap Co. of Strongsville, Ohio, can be used. The entire assembly (1011', 1042, 1052) is passed through an activator 1054, if necessary (in phantom), and rollers (one indicated at 1056) to complete lamination. Continuous carrier strips 1089, carrying the pressure sensitive adhesive forming layer 1080, are applied to the underside of laminated intermediate sheet product 1011". The laminated sheet product 1011" with strips 1089 is passed through a scorer 1058, which separates each individual sheet product 1010a-j from one another and from the remainder of the sheet 1011", which is scrap, and further defines the individual removable elements 1062, 1072, scrap 1074 and closed perimeter opening 1068 of each individual sheet product 1010a, etc. If the unique code stored magnetically on the magnetic data strip 1028 differs from either the printed code 1024/1025 or the RF transponder code in storage 28, it would be desirably and may be necessary to provide yet another data set on a portable data storage element like element 100 of FIG. 4 with respect to the collection of the individual sheet products 1010a et al. It has been found possible to encode magnetic strips 128 continuously applied to a continuous sheet product like 1011', 1011" before the individual removable elements are scored or removed from the continuous sheet. Equipment is currently available from Atlantic Zeiser of West Caldwell, N.J., which permits the combination of optical reading of printed bar codes (e.g. 1024, 1025 et al.) on the continuous strip product 1011" and encoding the appropriate magnetic code on the magnetic strip material 44' before the continuous sheet product 1011" passes through the scorer 1058.

FIGS. 22 and 23 show opposite major planar sides of an eleventh embodiment, multi-layer, integral, individual printed sheet product of the present invention indicated generally at 1110a. Sheet product 1110a is virtually identical to sheet product 1010a but for a different shape and size to the first removable identification element 1162, which is generally bullet shaped rather than rectangular like element 1062 and smaller than element 1062. Various individual features of sheet product 1110a have been numbered and correspond to those of sheet product 1010a incremented by 100. The cross section of the embodiment 1110a would be generally the same as that shown in FIG. 18 with identical components but possibly different lengths for elements 1062, 1162. Sets or collections of multiple individual sheet products 110a, etc. would be made in the same manner of products 1010a, etc. as shown in FIGS. 20 and 21. It should be noted that the individual products 110a, etc. can be appropriately sized and laid out on sheet of the core material such that same carrier 1090 with multiple RFID transponder assemblies 27a, etc. can be used in the manufacture of elements 1110a, etc. as well as other elements 1010a, etc. Other shapes, in particular the generally triangular shape magnetic tags of FIGS. 7-12 can be made in the same fashion.

FIG. 24 depicts a plan view of a twelfth embodiment exemplary individual printed sheet product of the present invention indicated at 1210a. This product is substantially identical to the previous products but for the shape of the base of the first removable identification element 1262 which is generally rectangular beneath a generally triangular upper portion of the element such that the lateral opposing edges 1228a, 1228b of the magnetic stripe 1228 are substantially parallel to one another.

Scored sections 1274 and 1275 are both scrap and can be removed separately from section 1272. The RFID transponder assembly 1227a is from a different manufacture and a different shape from those shown in the devices of FIGS. 17-24. However, assembly 1227a has its own electro/magnetic storage element indicated diagrammatically at 1228a in phantom containing a stored unique electro/magnetic code. However, pluralities of the transponders 1227, each with its own, unique, stored electro/magnetic code, would be supplied in sheets similar to sheet 1090 in FIG. 20 for the production of several individual sheet products 1210a, etc. at one time. Again, a magnetic stripe 1228 is provided for electro/magnetic data storage of various data including a separate unique electro/magnetic code which may or not be the same as the code stored in the assembly 1227a or printed on the core at 1224, 1225, but different from each other code stored on any magnetic stripe element of any other individual sheet product (e.g. 1210b, etc.). Finally, printed unique codes 1224, 1225 are provided on each individual element 1210a, etc. The printed unique code "1154" is shown only in a numeral format but the bar code representation could be provided as well in variable data field 1225, if desired.

FIGS. 25 and 26 are plan and cross sectional views, respectively, of a thirteenth individual printed sheet product of the present invention indicated and generally at 1310a. As with embodiment 1010a of FIGS. 17-19, individual printed product 1310a has a core indicated generally at 1312, which is preferably provided in the embodiment of FIG. 26 by separate first and second flexible core strips 1318, 1320 of printable material, preferably a microvoided, polysilicate material like that described previously. The two core strips 1318, 1320 are preferably joined together and around an RFID transponder assembly 1327a. Outer surfaces of the core strips 1318 and 1320 define major planar opposing first and second sides 1314, 1316, respectively of the core. Major planar side 1314 is shown in plan view in FIG. 25. At least the one major side 1314 is printed with a plurality of variable data fields 1324, 1325, 1326, each bearing the same unique printed code, in this example, 0000098. The code in each variable data field is printed in both numeral and bar formats. If desired, a first flexible preferably transparent cover strip 1340 (indicated in phantom in FIG. 26) can be integrally and permanently secured to the first side 1314 of the core 1312 by appropriate means such as an appropriate adhesive layer 1341 (also in phantom). The electro/magnetic data storage element 1328a of the assembly 1327a is further indicated in phantom in FIG. 25. Finally, an exposable pressure sensitive adhesive layer 1380 is applied to the major planar side 1316 of the core 1312 and is covered with a removable, protective release strip 1382 which backs the entire individual sheet product 1310a. The individual sheet product 1310a further includes scoring 1360a, 1360b, etc. through the core 1312 and the first cover strip 1340, if provided, to define a plurality of individual identification elements separable from one another and removable from the overall product 1310a. Preferably, scoring 1360a defines a first removable element 1362 including both the RFID transponder assembly 1327a and the first variable data field 1324 with unique printed code as well as the static graphic field 1336. Scoring 1360b defines a second removable identification element 1373 bearing a second variable data field 1325 with the unique printed code. Finally, scoring 1360c defines yet a third removable identification element 1372 bearing the third variable data field 1326 with the unique printed code. Preferably, the scoring 1360 does not extend entirely through the individual printed sheet product 1310a but stops after passage through the core 1312 or at least before cutting entirely through the removable protective strip 1382. Done in this fashion, each scoring 1360a, 1360b, 1360c can be a continuous loop. The elements 1362, 1372, 1373 are removable from the individual sheet product by peeling back a remaining portion 1374 of the individual sheet product from around each of the removable elements 1362, 1372, 1373, which then can be applied to the surface of any desired object.

FIG. 27 depicts an alternate possible construction of printed sheet product 1310a referred to as 1310a' in FIG. 27. FIG. 27 is also a view taken along the lines 26-26 in FIG. 25. In this form, individual sheet product 1310a' includes a flexible sheet core 1312' preferably formed by only a single sheet of the microvoided, polysilicate printable material previously identified. The core sheet 1312' has two opposing major planar sides, first side 1314 seen in FIG. 25 and a second side 1316'. Permanently and integrally fixed together with the second side 1316' of the core 1312' is the RFID transponder assembly 1327a with its RF responsive data storage element 1328a. Finally, an exposable pressure sensitive adhesive (PSA) layer 1380 preferably is applied directly to side 1316' of the core 1312' and over the exposed surface of the transponder assembly 1327a. A removable protective release strip 1382 is applied over the PSA layer 1380. Thus, individual sheet product 1310a' is substantially identical to the construction 1310a of FIG. 26 but lacks a second core strip 1320. Scoring 1360a', 1360b', 1360c', extends only through the single layer 1318 forming core 1312 and any first cover strip 1340, if provided, to define the three removable elements 1362', 1372', 1373'.

FIG. 28 depicts the use of the removable elements of the individual sheet product 1310a of FIGS. 25-27. RFID tag 1362 is applied to one side of a conventional identification card 1300 thereby providing a machine readable, permanently stored electro/magnetic unique code to the card 1300. The other removable identification elements 1372, 1373 (and additional identical or similar elements, if desired) can be used to mark other documents used to record or to notify others of the identity of the individual who was assigned the unique electro/magnetic code.

As an example, RFID individual printed sheet products with removable RFID tag element with electro/magnetic unique code and magnetic stripe previously described have been made using Teslin® microvoided, polysilicate sheet, Texas Instrument Tag-it™ HF-1 miniature, rectangular transponder inlays and high coercivity magnetic stripe material of JCP Enterprises Inc. of Gardnerville, Nev. The PSA coated cover strip material may be obtained from Enterprises Tape Co. of Dalton, Ill. among others. The transponders have 64 bit, factory installed unique codes and approximately 2000 bits of rewritable data storage. The magnetic stripe material successfully used with these transponders had a nominal write coercivity of 2750 Orsteads. There was no perceived interaction or interference between the magnetic stripe material (even the high coercivity material) and the transponder assembly. Each was able to be successfully read by conventional magnetic swipe and transponder interrogation units, even with the magnetic stripe at least partially overlying the RFID assembly.

The magnetic strip data storage element 128 can be of a conventionally low coercivity for writing purposes, such as about three hundred Oersted as is found on most conventional debit and credit cards, or a high write coercivity of more than one thousand Oersted, preferably more than two thousand and more preferably between about twenty-seven hundred and four thousand Oersted. Low or high coercivity magnetic strip may be obtained from various manufacturers including Green Corp Magnetics, Inc. having a business location in Havertown, Pa. or JCP Enterprises, Inc. having a business address of Gardenerville, Nev. JCP can further provide a transparent polyester cover strip with an integral low or high coercivity magnetic strip with a polyester adhesive coating on one side that can be applied directly to a core and bonded to a core by heat and pressure. Other bonding systems/steps can be used. The magnetic strip is located on the inner side of the polyester material which is only about twenty-five microns in thickness. The higher coercivity costs slightly more to provide but strongly resists demagnetization including inadvertent demagnetization by security devices commonly found in retail stores used to erase data on magnetic security devices adhered to products being sold.

The microvoided sheet material is superior to non-voided materials used in all other known examples of encasing RFID transponder assemblies in plastic tags because the material readily collapses over the assemblies when the individual sheet products are heated and pressed to laminate them without damage to the assemblies. Prior individual printed sheet products with just printed codes or printed code and magnetic stripe typically used the microvoided sheet product in a single layer ten mils thick for sufficient rigidity and resilience. Double sheet constructions like products 1010a, 1110a, 1210a and 1310a were made using seven mil thick Teslin®. The presence of the aforesaid RFID transponder assemblies in these individual sheet products with two core strips could not be felt, the microvoided material essentially collapsing and possibly flowing around the assemblies where the assemblies were present between the sheets. In contrast, when bonded between sheets of conventional polymer card stock such as PVC or polyester, which lack natural voids, a cavity has to be made to receive the RFID assembly or a lump is created when the sheet(s) are(is) bonded to the RFID assembly. The microvoided sheet products further bond together better than the conventional polymer sheet stock it is believed because the adhesive penetrates the porous sheet better than the conventional polymer card sheet stock, which is essentially without voids. The same is true for the outer protective polyester cover sheets and the magnetic stripe material if applied directly to the microvoided core material. Finally, the microvoided products are "softer" and less brittle. As a result individual removable identification elements, particularly cards and tags, tend not to peel, crack of break like conventional PVC cards. The closed perimeter provided in the various tags disclosed above do not require reinforcement as would similar openings through the conventional PVC material. Furthermore, this softer material transfers less pressure and stress to the transponder assemblies 27 when the removable identification elements are flexed during normal use.

Finally, the following related applications are incorporated by reference herein in their entirety: Ser. Nos. 09/595,825; 09/532,113; 60/139,684; 60/401,789.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A multilayer, integral, individual printed sheet product comprising:
    a flexible sheet core having major opposing first and second sides, the core being printed on at least one of the major sides, the printing on at least the one major side including at least a first variable data field with a unique printed code;
    a first flexible cover strip integrally and permanently secured to the first side of the core;
    a radio frequency responsive data storage element permanently and integrally fixed together with at least one of the core and the first cover strip; and
    scoring extending at least sufficiently through the sheet product to define a first identification element removable from a remainder of the sheet product, the first removable identification element including at least the radio frequency responsive data storage element and only part of the first flexible cover strip, and a remainder of the first flexible cover strip being left on a remainder of the core bearing at least the first printed variable date field with unique printed code;
    wherein the core comprises a layer of a porous, microvoided, polymer sheet material.

2. The individual printed sheet product of claim 1 wherein the core consists essentially of the porous, microvoided polymer material.

3. The individual printed sheet product of claim 1 wherein the scoring further defines a closed perimeter opening entirely within and entirely through the printed sheet product.

4. The individual printed sheet product of claim 3 wherein the first removable identification element at least one has a major planar side with a maximum dimension in the major planar side of the element of less than three and one-half inches.

5. A multilayer, integral, individual printed sheet product comprising:
    a flexible sheet core having major opposing first and second sides, the core being printed on at least one of the major sides, the printing on at least the one major side including at least a first variable data field with a unique printed code;
    a first flexible cover strip integrally and permanently secured to the first side of the core;
    a radio frequency responsive data storage element permanently and integrally fixed together with at least one of the core and the first cover strip;
    scoring extending at least sufficiently through the sheet product to define a first identification element removable from a remainder of the sheet product, the first removable identification element including at least the radio frequency responsive data storage element and only part of the first flexible cover strip, and a remainder of the first flexible cover strip being left on a remainder of the core bearing at least the first printed variable date field with unique printed codes; and a second flexible cover strip integrally and permanently secured to the major second side of the core.

6. The individual printed sheet product of claim 5 wherein the second cover strip is transparent.

7. The individual printed sheet product of claim 6 wherein the second cover strip at least fully covers one major planar side of the first identification element.

8. The individual printed sheet product of claim 5 wherein at least one of the first and second cover strips is transparent and covers only part of one major side of the core.

9. The individual printed sheet product of claim 5 wherein at least one of the first and second cover strips extends over the unique printed code of the first variable field printed on the core.

10. A multilayer, integral, individual printed sheet product comprising:
a flexible sheet core having major opposing first and second sides, the core being printed on at least one of the major sides, the printing on at least the one major side including at least a first variable data field with a unique printed code;
a first flexible cover strip integrally and permanently secured to the first side of the core;
a radio frequency responsive data storage element permanently and integrally fixed together with at least one of the core and the first cover strip; and
scoring extending at least sufficiently through the sheet product to define a first identification element removable from a remainder of the sheet product, the first removable identification element including at least the radio frequency responsive data storage element and only part of the first flexible cover strip, and a remainder of the first flexible cover strip being left on a remainder of the core bearing at least the first printed variable date field with unique printed code;

wherein the first flexible cover strip at least partially overlies the printing including the unique printed code, the first cover strip being sufficiently transparent to read the unique printed code therethrough.

11. The multilayer, integral, individual printed sheet product of claim 10 wherein the scoring further defines a closed perimeter opening entirely within and entirely through the printed sheet product and the first removable identification element, the opening being sufficiently large to receive a key holding member therethrough.

12. The individual printed sheet product of claim 10 being part of a collection of individual sheet products, each individual sheet product being identical to each other individual sheet product of the collection except for the unique printed codes and any electromagnetic codes stored in the radio frequency responsive data storage element, at least the printed codes being different between all individual sheet products of the collection.

* * * * *